United States Patent
Low et al.

(10) Patent No.: US 12,200,480 B2
(45) Date of Patent: Jan. 14, 2025

(54) SYSTEMS AND METHODS FOR A QUANTUM PROXY SERVER HANDOVER MECHANISM

(71) Applicant: Verizon Patent and Licensing Inc., Basking Ridge, NJ (US)

(72) Inventors: Mun Wei Low, Irving, TX (US); Manuel Enrique Caceres, Basking Ridge, NJ (US); Lee E. Sattler, Mount Airy, MD (US); Connie P. Grigg, Jacksonville, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 277 days.

(21) Appl. No.: 17/580,250

(22) Filed: Jan. 20, 2022

(65) Prior Publication Data

US 2023/0232220 A1   Jul. 20, 2023

(51) Int. Cl.
| | |
|---|---|
| *H04W 12/041* | (2021.01) |
| *H04L 9/08* | (2006.01) |
| *H04L 9/32* | (2006.01) |
| *H04W 12/03* | (2021.01) |
| *H04W 12/0431* | (2021.01) |
| *H04W 12/06* | (2021.01) |

(52) U.S. Cl.
CPC .......... *H04W 12/041* (2021.01); *H04L 9/0852* (2013.01); *H04L 9/0869* (2013.01); *H04L 9/3247* (2013.01); *H04W 12/03* (2021.01); *H04W 12/0431* (2021.01); *H04W 12/06* (2013.01)

(58) Field of Classification Search
CPC .......... H04W 12/041; H04W 12/0431; H04W 12/03; H04W 12/06; H04L 9/0852; H04L 9/0869; H04L 9/3247
See application file for complete search history.

(56) References Cited

U.S. PATENT DOCUMENTS

| | | | |
|---|---|---|---|
| 10,412,059 B2 * | 9/2019 | Roth | H04L 63/102 |
| 11,349,646 B1 * | 5/2022 | Delaney | H04L 63/0478 |
| 2011/0317836 A1 * | 12/2011 | Yeh | H04L 9/0855 380/255 |
| 2020/0228505 A1 * | 7/2020 | Lapidous | H04L 63/166 |
| 2022/0224532 A1 * | 7/2022 | Bezzateev | H04L 9/304 |
| 2023/0280812 A1 * | 9/2023 | Hara | G06F 1/3287 713/320 |

* cited by examiner

*Primary Examiner* — Luu T Pham
*Assistant Examiner* — Paul J Skwierawski

(57) ABSTRACT

A device may include a processor configured to obtain a quantum key generated using quantum random numbers received from a quantum random number generator. The processor may be further configured to obtain a digital signature for a uniform resource locator (URL) associated with the obtained quantum key, wherein the digital signature is received from a security device configured to provide the quantum key to a user equipment (UE) device; receive a request from an application server to function as a proxy for a secure session with the UE device; authenticate the secure session with the UE device using the quantum key and the digital signature; and proxy the secure session between the UE device and the application server.

20 Claims, 8 Drawing Sheets

SYSTEMS AND METHODS FOR A QUANTUM PROXY SERVER HANDOVER MECHANISM

BACKGROUND INFORMATION

Computer devices used by consumers and entities such as government agencies, financial institutions (e.g., banks or trading houses), or large corporate enterprises, send and receive sensitive information that requires a high degree of security. Furthermore, mobile wireless communication devices, such as smart phones, are also increasingly being used for services, such as financial transactions, that require a high degree of security. In order to securely transfer information, computer systems may use encryption to protect sensitive information and/or may require authentication or authorization of a particular user or device. The user of encryption may require the secure transfer of cryptographic keys. Efficient and reliable delivery of cryptographic keys, and authentication using cryptographic keys, poses various challenges.

DETAILED DESCRIPTION OF PREFERRED EMBODIMENTS

Figure 1:
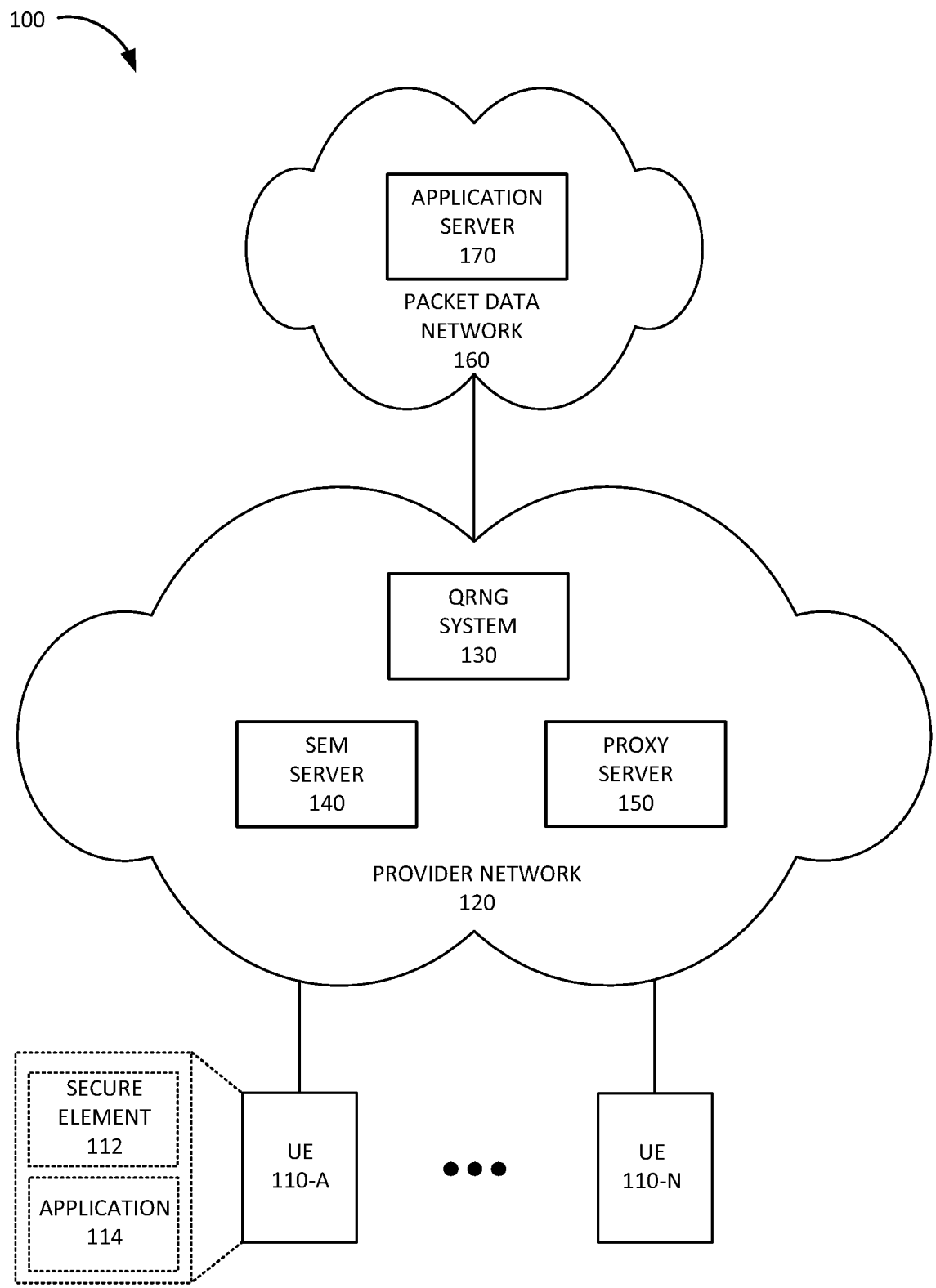
FIG. 1 is a diagram illustrating an environment according to an implementation described herein.

The following detailed description refers to the accompanying drawings. The same reference numbers in different drawings identify the same or similar elements.

Security protocols used for encryption and/or digital signatures, such as a Public Key Infrastructure (PKI) system, may use session keys and/or digital certificates for authenticating users or devices. A PKI system manages the creation, storage, and distribution of digital certificates and uses the digital certificates to verify ownership of public keys. Generation of digital certificates and/or session keys may require use of random numbers in order to prevent an unauthorized party from predicting a certificate or key value.

The quality of random numbers depends on the techniques used to produce them. High quality random numbers are less predictable and are said to have high entropy. For example, random numbers may be generated using software techniques known as cryptographic pseudorandom number generation, in which a seed value is used to initialize a computationally complex mathematical function that generates pseudorandom values. However, pseudorandom number generation is not appropriate for high security applications because such methods generate relatively low entropy random numbers. Systems that use low entropy random numbers may be vulnerable to crypto-analytic attacks.

Random numbers with a higher entropy may be generated using a hardware random number generator (HRNG). A HRNG generates random numbers using a physical process, rather than an algorithm. The physical processes may include environmental conditions measured by a sensor associated with a computer device, such as, for example, thermal noise measured by a temperature sensor, ambient audio signals picked up by a microphone, variations in ambient light captured by an optical camera, variation in infrared signals measured by a proximity sensor, and/or another type of environmental parameter measured by a sensor.

User devices, such as smart phones, may include sensors that may be used to sample environment conditions to generate high entropy random numbers. However, generation of certificates or keys may often need to be performed by a trusted device in a secure network. Furthermore, server devices may be "headless," meaning that they do not include any input or output devices, or environmental sensors. Furthermore, a server device may be handling a large number of connections that quickly exhaust any sources of entropy available to the server device. Therefore, server devices may often be starved for entropy.

A quantum random number generator (QRNG) may generate quantum random numbers using quantum phenomena that cannot be predicted because they are fundamentally random. Examples of such quantum phenomena include polarizations of photons traveling through a semi-transparent mirror, nuclear decay from a radiation source measured by a Geiger counter, shot noise in an electronic circuit measured by a photodiode or an electron tube, amplification of tunneling electrons through the band gap of a semiconductor, homodyne detection of fluctuations in vacuum energy, and/or other types of quantum phenomena. However, a QRNG may be expensive and not available to particular computer devices that are in need of high entropy random numbers. Therefore, a QRNG may be used to distribute quantum keys to other devices, such as, for example, an application server that needs to authenticate a secure session (e.g., an encrypted session, etc.) with a user equipment (UE) device. A "quantum key," as the phrase is used herein, refers to a particular number of quantum bits generated by a QRNG based on detecting a particular quantum phenomenon and used as a key for authenticating a secure session.

In many situations, although QRNGs are available for use, an application server may not be "quantum ready." An application server may be "quantum ready" if the application server is ready to perform quantum key authentication with a UE device. As an example, an application server may identify itself as quantum ready when the application server is configured to perform authentication of secure sessions using quantum keys. As another example, an application server may identify itself as quantum ready for a particular secure session, or for a particular UE device, when the application server receives a quantum key for the particular secure session, or for the particular UE device, from the QRNG. As yet another example, an application server may identify itself as quantum ready when a security requirement for quantum authentication is satisfied. A security requirement may include, for example, a requirement that the application server be a member of a Software Defined Perimeter (SDP) network. An application server that is not quantum ready may nevertheless request, and/or be required, to perform quantum authentication for secure sessions.

Implementations described herein relate to systems and methods to proxy secure sessions established using a quantum key and/or implement a handover mechanism for secure sessions established using a quantum key. When an application server is not quantum ready, a proxy server may be configured to perform quantum authentication of UE devices on behalf of the application server and proxy secure sessions between a UE device and the application server. Furthermore, the proxy server may perform a handover process to hand over a secure session to an application server if the application server becomes quantum ready, and/or to hand over a secure session authentication using a non-quantum key from the application server to the proxy server if the application server is not quantum ready.

Thus, the proxy server may be configured to proxy sessions between a UE device and an application server. The proxy server may be configured to obtain a quantum key generated using quantum random numbers received from a QRNG. Furthermore, the proxy server may be configured to obtain a digital signature, for a uniform resource locator (URL) associated with the obtained quantum key, from a security device configured to provide the quantum key to the UE device. The UE device may be instructed, by the security device, to set up a secure session with the quantum key using the URL associated with the quantum key. The URL may direct the UE device to the proxy server and may include, for example, a session identifier (ID) associated with the quantum key. Furthermore, the proxy server may send an indication to the application server that the UE device is ready for authentication.

If the application server is not quantum ready, the application server may request that the proxy server act as a proxy for secure sessions between the UE device and the application server. Thus, the proxy server may receive a request from an application server to function as a proxy for a secure session with the UE device, authenticate the secure session with the UE device using the quantum key and the digital signature, and proxy the secure session between the UE device and the application server. For example, the proxy server may forward messages associated with the secure session from the UE device to the application server and/or forward messages associated with the secure session from the application server to the UE device.

Authenticating the secure session with the UE device may include verifying the URL used by the UE device to establish the secure session using the digital signature and/or using the quantum key to establish the secure session. For example, the proxy server may perform a Transport Layer Security (TLS) handshake with the UE device using the quantum key.

In some implementations, proxy server may proxy a secure session that has already been established between the UE device and the application server using a non-quantum key (e.g., a key generated using a pseudorandom technique). Thus, after authenticating the secure session with the UE device, the proxy server may transfer an existing session between the UE device and the application session to the secure session established between the UE device and the proxy server and instruct the application server to terminate the existing session.

If the application server is quantum ready, or becomes quantum ready at a later time, the application server may send an indication to the proxy server that the application server is ready for quantum key authentication. The proxy server may receive the indication and, in response, generate a new URL for the application server for the secure session and provide the new URL to the security device to forward to the UE device. The security device may provide the new URL to the UE device and the UE device may use the new URL to establish a new secure session with the application server.

After the new secure session has been established between the UE device and the application server, the application server may send an indication to the proxy server that the UE device has established the new secure session with the application server using the new URL. In response, the proxy server may transfer the secure session with the UE device to the new secure session and terminate the secure session between the UE device and the proxy server.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"); a provider network 120 that includes a QRNG system 130, an Secure Element Manager (SEM) server 140, and a proxy server 150; and a packet data network 160 that includes an application server 170.

UE device 110 may include any computer device capable of communicating with application server 170 via a wired, optical, and/or wireless connection (e.g., using a cellular network via a base station (not shown in FIG. 1), a WiFi access point (not shown in FIG. 1), etc.). For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous or semi-autonomous vehicle, an unmanned aerial drone, and/or another type of electronic device.

UE device 110 may include a secure element 112 and an application 114. Secure element 112 may manage authentication of secure sessions for application 114. For example, secure element 112 may receive a quantum key and a URL from SEM server 140 and store the quantum key in association with the URL. The URL may direct UE device 110 to application server 170, if application server 170 is quantum ready, or to proxy server 150, if application server 170 is not quantum ready. When application 114 seeks to establish a secure session with application server 170, secure element 112 may provide the URL to application 114 to request a secure session (e.g., a TLS connection) and authenticate the secure session using the quantum key.

Provider network 120 may include a network managed by a provider of communication services. Provider network 120 may provide communication services to UE devices 110 by enabling UE devices 110 to communicate with each other and/or with devices in other networks, such as provider network 120 and/or packet data network 160. For example, provider network 120 may include Fourth Generation (4G), a Fifth Generation (5G), and/or another type of Radio Access Network (RAN) with base stations that provide wireless cellular access for UE devices 110 and a core network to manage the RAN and provide Internet Protocol (IP) connectivity to UE devices 110. Additionally, or alternatively, provider network 120 may include, and/or be connected to and enable communication with, a local area network (LAN), a wide area network (WAN), a metropolitan area network (MAN), an optical network, a cable television network, a satellite network, an ad hoc network, a telephone network (e.g., the Public Switched Telephone Network (PSTN)), an intranet, or a combination of networks.

In some implementations, provider network 120 may include an SDP network. The SDP network may include an SDP controller that functions as, or interfaces with, a certificate authority and authenticator. Client devices seeking to access devices in the SDP network may include an SDP client that has to interface with an SDP gateway on a particular device in the SDP network in order to communicate with the particular device. The SDP controller may manage all connections between SDP clients and SDP gateways. For example, each connection between an SDP client and an SDP gateway may be established via a secure connection, such as a TLS connection established using certificates generated by the SDP controller. In some implementations, SDP connections may be established using Single Packet Authorization (SPA), in which a single packet is used to transmit authorization data. After the SPA packet is verified, the TLS handshake to establish the TLS connection may be initiated.

As indicated, provider network 120 may include QRNG system 130, SEM server 140, and proxy server 150. QRNG system 130 may include a set of QRNG appliances. Each QRNG appliance may generate a stream of quantum random numbers based on quantum phenomena. For example, each QRNG appliance may include a set of detectors that measure values for parameters associated with a particular quantum phenomenon, such as photons traveling through a semi-transparent mirror, nuclear decay from a radiation source measured by a Geiger counter, shot noise in an electronic circuit measured by a photodiode or an electron tube, amplification of tunneling electrons through the band gap of a semiconductor, homodyne detection of fluctuations in vacuum energy, and/or other types of quantum phenomena.

The QRNG appliance may generate a real time stream of quantum bits at a particular rate (e.g., 4 Megabits per second (Mbits/sec), 8 Mbits/sec, 16 Mbits/sec, etc.) based on the number of included detectors and generate quantum keys from the generated quantum bits. Furthermore, the QRNG appliance may store the generated quantum bits in a data store to be retrieved at a later time when a quantum key is to be created. The stored quantum random numbers may be removed (e.g., deleted) from the data store after they are used to generate a quantum key to ensure that no quantum random number is used more than once. Thus, each quantum random number may correspond to a cryptographic nonce.

SEM server 140 may include one or more devices, such as computer devices and/or server devices, which manages secure elements in, or connected to, provider network 120. For example, SEM server 140 may function as a security device that receives quantum keys from QRNG system 130. SEM server 140 may generate a URL to be used with a quantum key and may provide the quantum key and the generated URL to secure element 112 of UE device 110. Furthermore, SEM server 140 may function as a certificate authority in provider network 120 and may generate and provide a digital signature for the URL along with a hash of the associated quantum key to proxy server 150. Moreover, SEM server 140 may receive a new URL to be used with the quantum key from proxy server 150. The new URL may direct UE device 110 to application server 170 and may be provided by application server 170 to SEM server 140 via proxy server 150 when application server 170 becomes quantum ready.

Proxy server 150 may include one or more devices, such as computer devices and/or server devices, which are configured to proxy secure sessions between UE devices 110 and application server 170. Proxy server 150 may receive a request from UE device 110 to establish a secure session using a quantum key via a URL and may authenticate the URL using a digital signature received for the URL received from SEM server 140. Proxy server 150 may then establish a secure session using a quantum key associated with the URL. For example, proxy server 150 may perform a TLS handshake using the quantum key by authenticating UE device 110 based on a quantum key received from UE device 110 and the quantum key hash received from SEM server 140. Furthermore, proxy server 150 may handover a secure session to application server 170 if application server 170 becomes quantum ready. Moreover, proxy server 150 may receive a handover of a secure session from application server 170 that was authenticated using a non-quantum key (e.g., a pseudorandom key) after proxy server 150 authenticates a secure session with UE device 110 using a quantum key.

Packet data network 160 may include a packet data network, such as a local area network (LAN), a wide area network (WAN), a metropolitan area network (MAN), an optical network, a satellite network, a wireless network, an ad hoc network, an intranet, or a combination of networks. Packet data network 160 may include application server 170. Application server 170 may include one or more devices, such as computer devices and/or server devices, which are configured to communicate with application 114 running on UE device 110. Application server 170 may request that proxy server 150 proxy secure sessions between UE devices 110 and application server 170 when application server 170 is not quantum ready. If application server 170 is quantum ready, application server 170 may authenticate a secure session with UE device 110 using a quantum key.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
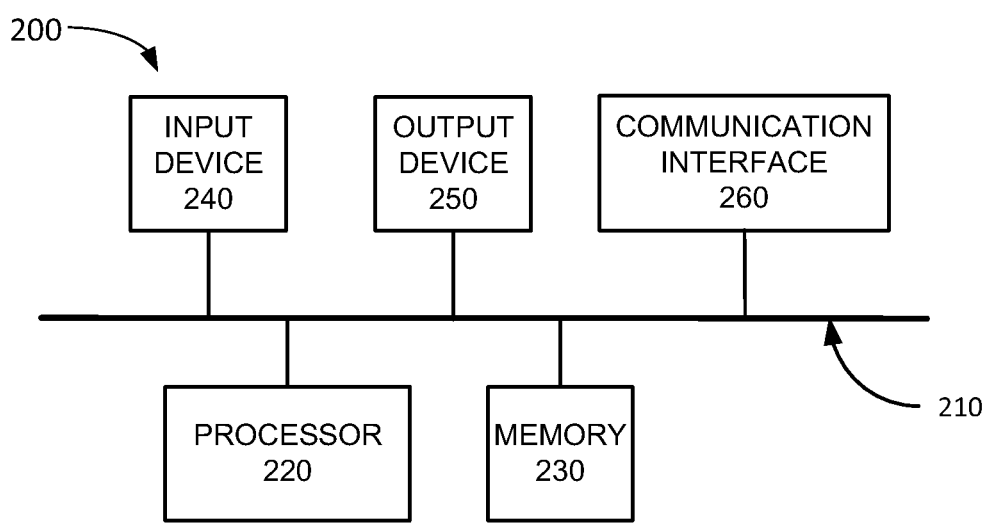
FIG. 2 is a diagram illustrating exemplary components of a device that may be included in a component of an environment according to an implementation described herein.

FIG. 2 illustrates example components of a device 200 according to an implementation described herein. UE device 110, QRNG system 130, SEM server 140, proxy server 150, and/or application server 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to proxying of secure sessions secured using a quantum key and/or implementing a handover mechanism for secure sessions secured using a quantum key. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
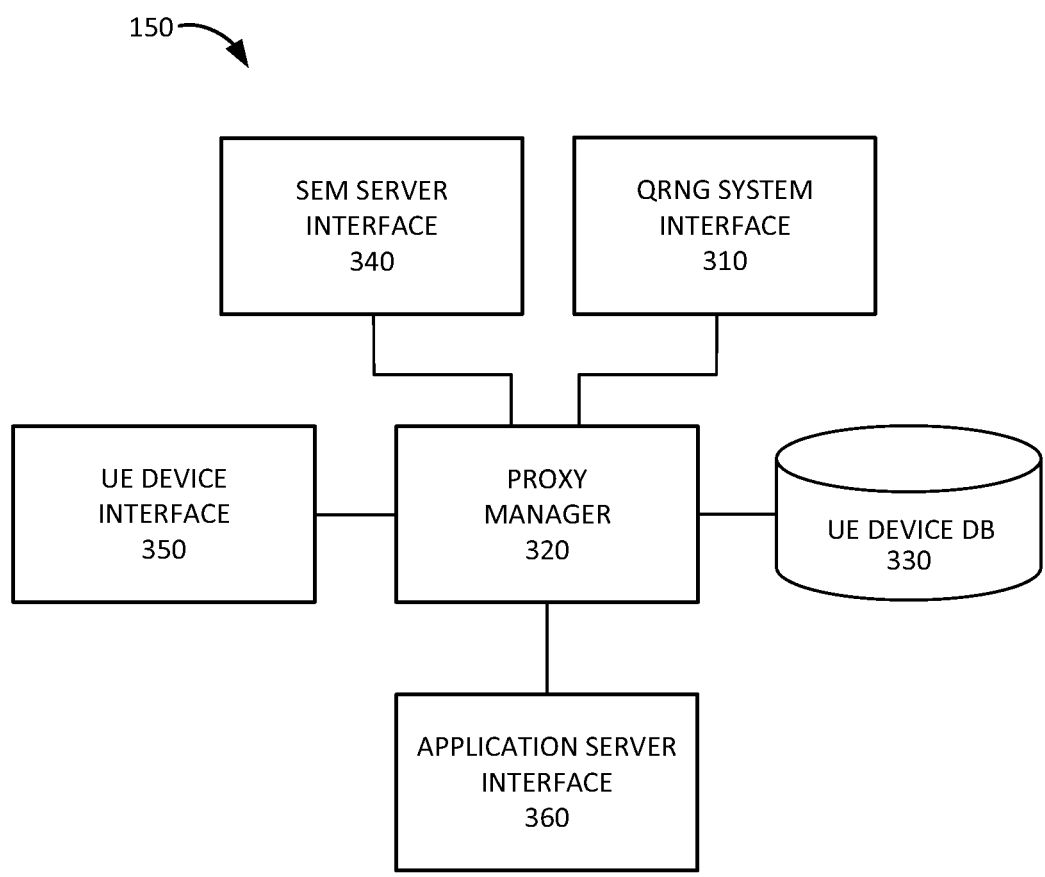
FIG. 3 is a diagram illustrating exemplary components of a proxy server according to an implementation described herein.

FIG. 3 is a diagram illustrating exemplary components of proxy server 150. The components of proxy server 150 may be implemented, for example, via processor 220 executing instructions from memory 230. Alternatively, some or all of the components of proxy server 150 may be implemented via hard-wired circuitry. As shown in FIG. 3, proxy server 150 may include a QRNG system interface 310, a proxy manager 320, a UE device database (DB) 330, a SEM server interface 340, a UE device interface 350, and an application server interface 360.

QRNG system interface 310 may be configured to communicate with QRNG system 130. For example, QRNG system interface 310 may receive quantum keys from QRNG system 130. Proxy manager 320 may receive a quantum key from QRNG system interface 310 and store the received quantum key in UE device DB 330. SEM server interface 340 may be configured to communicate with SEM server 140. For example, proxy manager 320 may receive a digital signature for a URL associated with a quantum key, along with a hash of the quantum key, and store the received information in UE device DB 330. Exemplary information that may be stored in UE device DB 330 is described below with reference to FIG. 4.

Proxy manager 320 may manage authentication of UE device 110 and proxying a secure session between UE device 110 and application server 170. For example, proxy manager 320 may receive a request from application server 170 to proxy a secure session for UE device 110. UE device 110 may use a URL obtained from SEM server 140 to establish a secure session via UE device interface 350. Proxy manager 320 may authenticate the URL based on the digital signature received from SEM server 140 and may then perform a TLS handshake with UE device 110 using the quantum key associated with the URL.

After establishing the secure session, proxy manager 320 may proxy the session for UE device 110 by forwarding messages associated with the secure session from UE device 110, via UE device interface 350, to application server 170, via application server interface 360, and/or by forwarding messages associated with the secure session from application server 170, via application server interface 360, to UE device 110, via UE device interface 350.

Although FIG. 3 shows exemplary components of proxy server 150, in other implementations, proxy server 150 may include fewer components, different components, additional components, or differently arranged components than depicted in FIG. 3. Additionally, or alternatively, one or more components of proxy server 150 may perform one or more tasks described as being performed by one or more other components of proxy server 150.

Figure 4:
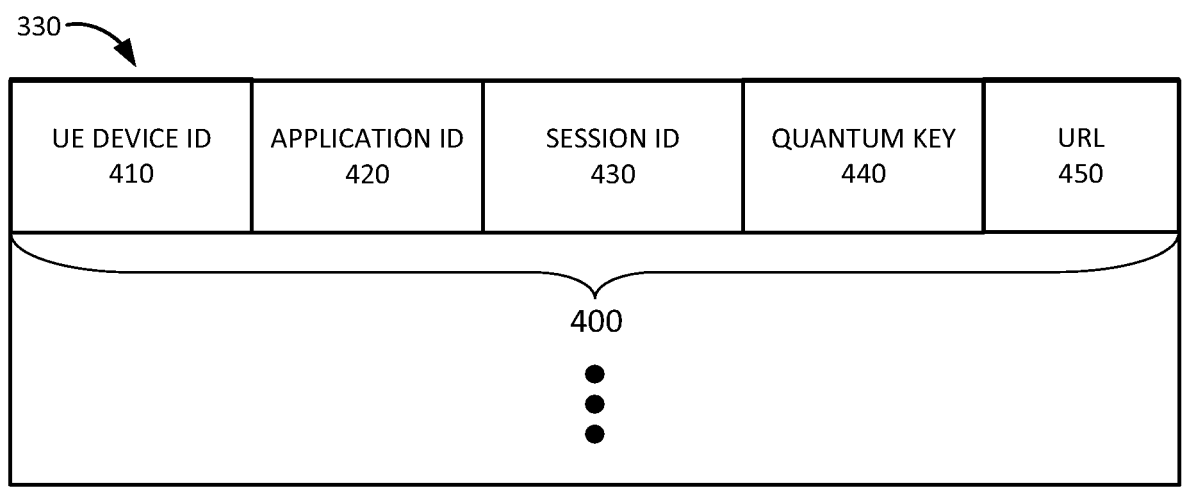
FIG. 4 is a diagram illustrating exemplary components of a user device (UE) database (DB) according to an implementation described herein.

FIG. 4 is a diagram illustrating exemplary information stored in UE device DB 330. As shown in FIG. 4, UE device DB 330 may include one or more UE device records 400. Each UE device record 400 may store information relating to a particular UE device 110. UE device record 400 may include a UE device identifier (ID) field 410, an application ID field 420, a session ID field 430 a quantum key field 440, and a URL field 450.

UE device ID field 410 may store an ID associated with a particular UE device 110, such as, for example, a Mobile Station International Subscriber Directory Number (MSISDN), a Mobile Directory Number (MDN), an International Mobile Subscriber Identity (IMSI), an International Mobile Equipment Identity (IMEI), an IP address, a Media Access Control (MAC) address, and/or another type of identifier associated with UE device 110.

Application ID field 420 may store an ID associated with an application installed on UE device 110. Furthermore, application ID field 420 may store information identifying application server 170 associated with the application, such as, for example, an IP address, MAC address, an application server name, and/or another type of ID associated with application server. Furthermore, application ID field 420 may store information indicating whether application server 170 is quantum ready.

Session ID field 430 may store information identifying a secure session between UE device 110 and application server 170 that has been established or is in the process of being established. Quantum key field 440 may store a quantum key associated with the secure session. URL field 450 may store a URL, and/or a digital signature for the URL, associated with the secure session.

Although FIG. 4 shows exemplary components of UE device DB 330, in other implementations, UE device DB 330 may include fewer components, different components, additional components, or differently arranged components than depicted in FIG. 4.

Figure 5:
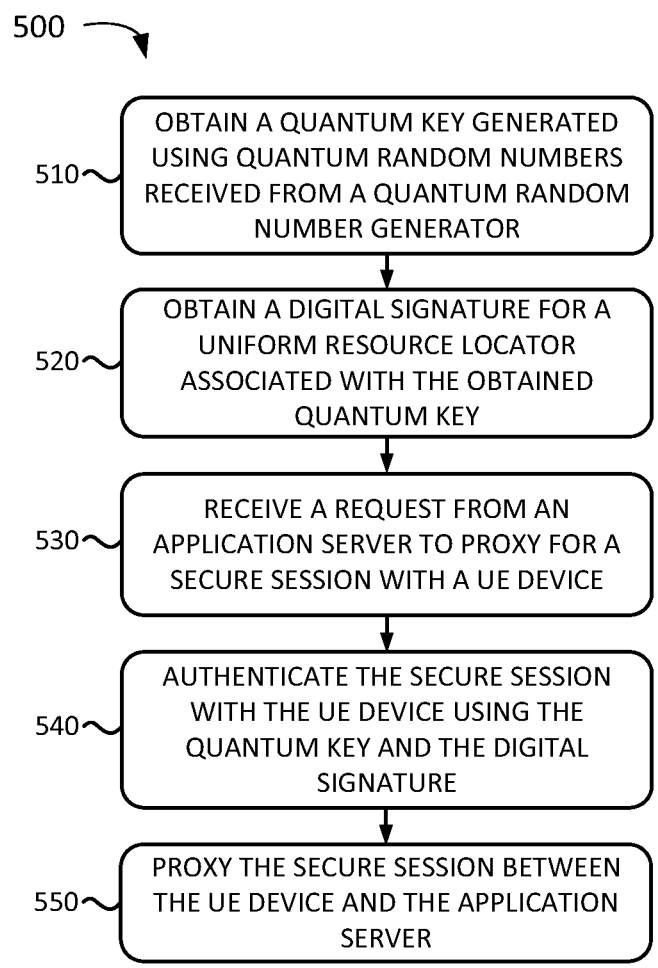
FIG. 5 is a flowchart of a process for proxying a secure session using a quantum key according to an implementation described herein.

FIG. 5 is a flowchart of a process 500 for proxying a secure session using a quantum key according to an implementation described herein. In some implementations, the process of FIG. 5 may be performed by proxy server 150. In other implementations, some or all of the process of FIG. 5 may be performed by another device or a group of devices separate from proxy server 150.

As shown in FIG. 5, process 500 may include obtaining a quantum key generated using quantum random numbers from a QRNG (block 510). For example, QRNG system 130 may generate a quantum key and provide the quantum key to proxy server 150. Process 500 may further include obtaining a digital signature for a URL associated with the quantum key (block 520). For example, SEM server 140 may generate a URL to be used with the quantum key and may inject the quantum key and the URL into secure element 112 of UE device 110. SEM server 140 may then generate a digital signature for the URL and provide the URL and the digital signature to proxy server 150 along with a hash of the quantum key. Proxy server 150 may use the hash of the quantum key to associate the URL with the quantum key and may use the digital signature to verify the authenticity of the URL when UE device 110 uses the URL to request to establish a secure session with proxy server 150.

Process 500 may further include receiving a request from an application server to proxy a secure session with a UE device (block 530) and authenticating the secure session with the UE device using the quantum key and the digital signature (block 540). As an example, application server 170 may not be configured for quantum authentication and may send a request to proxy server 150 to proxy all sessions between UE devices 110 and application server 170. As another example, application server 170 may establish a secure session with UE device 110 using a non-quantum key authentication method and may request to transfer the secure session to proxy server 150 so that the secure session is authenticated using a quantum key and proxied through proxy server 150. UE device 110 may request to establish a secure session using the URL obtained from SEM server 140. Proxy server 150 may determine that the URL is a valid URL provided by SEM server 140 to UE device 110 based on the digital signature obtained from SEM server 140 for the URL. UE device 110 may then use the quantum key to perform a TLS handshake with proxy server 150 to establish the secure session.

Process 500 may further include proxying the secure session between the UE device and the application server (block 550). For example, proxy server 150 may establish a secure session with application server 170 and forward messages associated with the secure session from UE device 110 to application server 170 and/or forward messages associated with the secure session from application server 170 to UE device 110.

Figure 6:
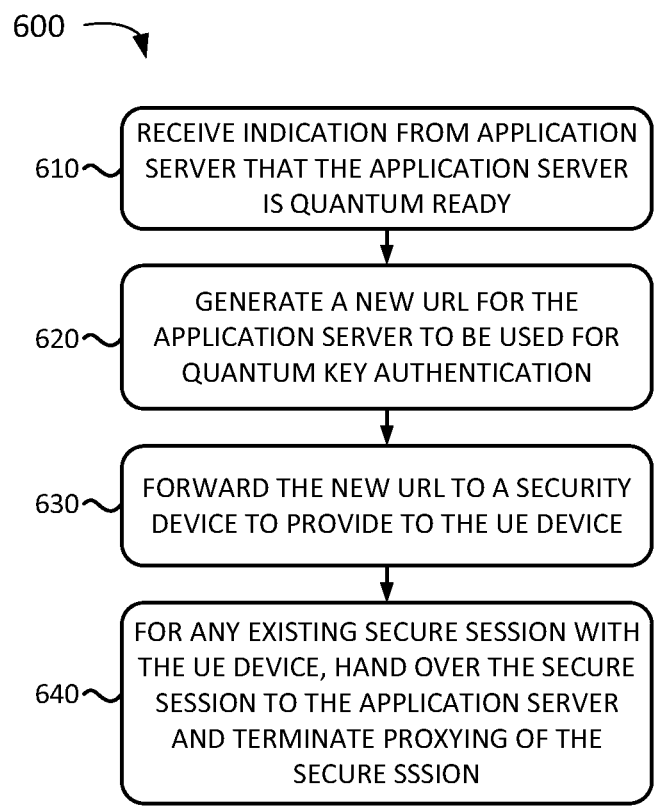
FIG. 6 is a flowchart of a process for transferring a secure session from a proxy server according to an implementation described herein.

FIG. 6 is a flowchart of a process 600 for transferring a secure session from a proxy server according to an implementation described herein. In some implementations, the process of FIG. 6 may be performed by proxy server 150. In other implementations, some or all of the process of FIG. 6 may be performed by another device or a group of devices separate from proxy server 150.

As shown in FIG. 6, process 600 may include receiving an indication from an application server that the application server is quantum ready (block 610), generating a new URL for the application server to be used for quantum authentication (block 620), and forwarding the new URL to a security device to provide to a UE device (block 630). As an example, application server 170 may become configured for quantum authentication and may indicate to proxy server 150 that UE devices 110 are now able to perform quantum authentication directly with application server 150. As another example, application server 170 may receive a quantum key for a secure session that is established and being proxied between UE device 110 and application server 170 via proxy server 150. Proxy server 150 may generate a new URL, for application server 170, to be used for the quantum authentication and may provide the new URL to SEM server 140 to inject into secure element 112 of UE device 110.

Process 600 may further include, for any existing secure session with the UE device, handing over the secure session to the application server and terminating proxying of the secure session (block 640). For example, UE device 110 may use the new URL, obtained from SEM server 140, to perform a quantum key authentication with application server 170 to establish a secure session. Once the secure session is authenticated and established, application server 170 may instruct proxy server 150 to hand over the secure session and terminate proxying the secure session. In response, proxy server 150 may terminate the secure session established with UE device 110.

Figure 7:
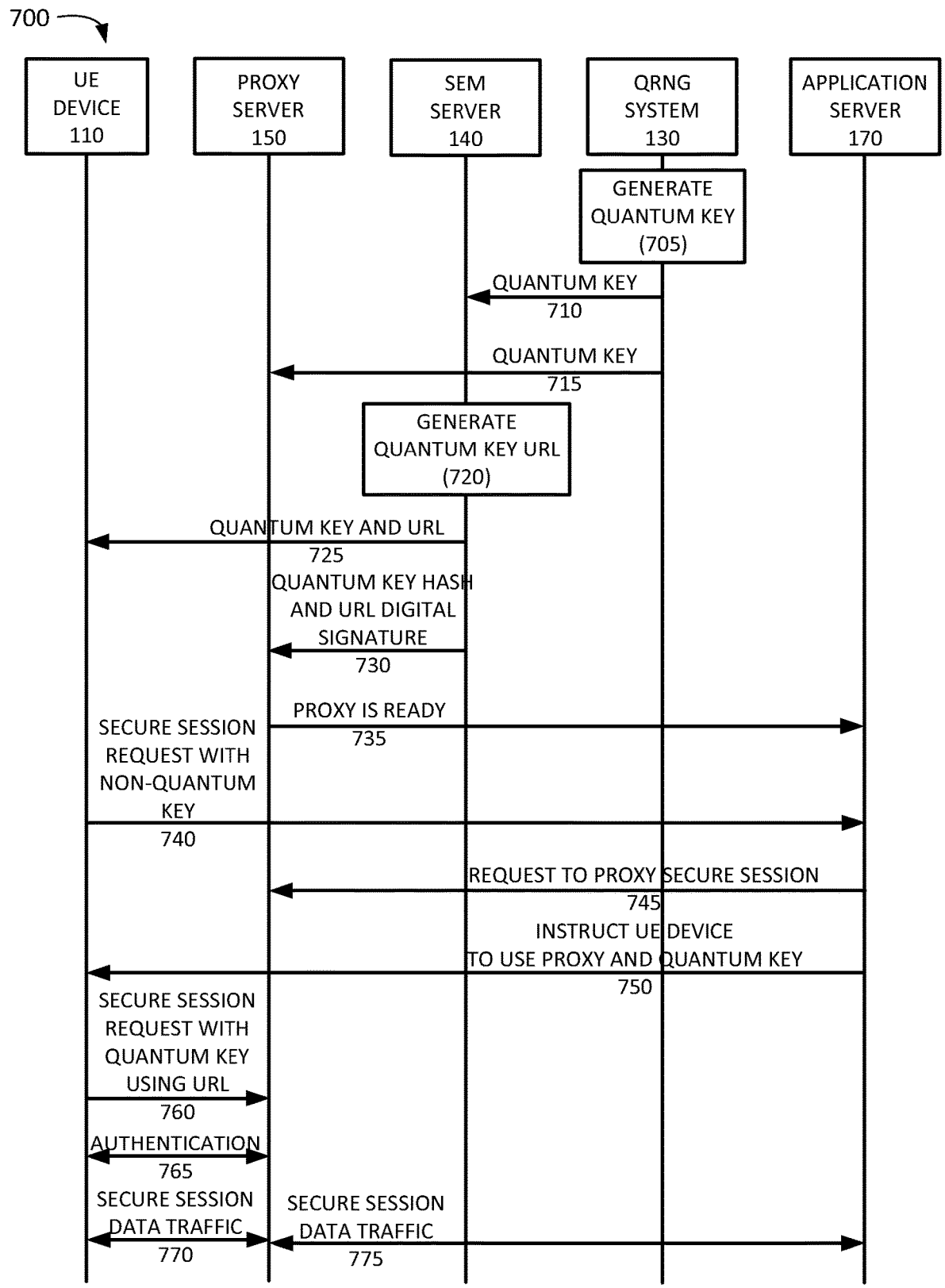
FIG. 7 is a first exemplary signal flow diagram according to an implementation described herein.

FIG. 7 is a first exemplary signal flow 700 according to an implementation described herein. Signal flow 700 may be performed when application server 170 is not quantum ready and requires proxy server 150 to proxy a session with UE device 110. As shown in FIG. 7, signal flow 700 may include QRNG system 130 generating a quantum key (block 705) and providing the quantum key to SEM server 140 (signal 710). Furthermore, QRNG system 130 may also provide the quantum key to proxy server 150 (signal 715). SEM server 140 may then generate a URL associated with the quantum key (block 720) and may provide the quantum key and the generated URL to UE device 110 (signal 725). SEM server 140 may further provide a hash of the quantum key and a digital signature of the URL to proxy server 140 (signal 730). Proxy server 150 may send an indication to application server 170 that proxy server 150 is ready to proxy a session between UE device 110 and application server 170.

At a later time, UE device 110 may establish a secure session, using a non-quantum key (e.g., a pseudorandom key, etc.), with application server 170 (signal 740). In response, application server 170 may determine that a more secure session using quantum authentication is required and, since application server 7 is not quantum ready, application server 170 may send a request to proxy server 150 to proxy a secure session between UE device 110 and application server 170 (signal 745) and may instruct UE device 110 to use a proxy and a quantum key for the application session (signal 750).

In response, UE device 110 may use the quantum key and URL obtained from SEM server 140 to request a secure session with proxy server 150 (signal 760). Proxy server 150 may authenticate the URL based on a digital signature received for the URL from SEM server 140 and perform a TLS handshake with UE device 110 using the quantum key (signal 765). After authenticating the secure session, proxy server 150 may begin to proxy the secure session between UE device 110 and application server 170 by forwarding data traffic from UE device 110 to application server 170 and/or forwarding data traffic from application server 170 to UE device 110 (signals 770 and 775).

Figure 8:
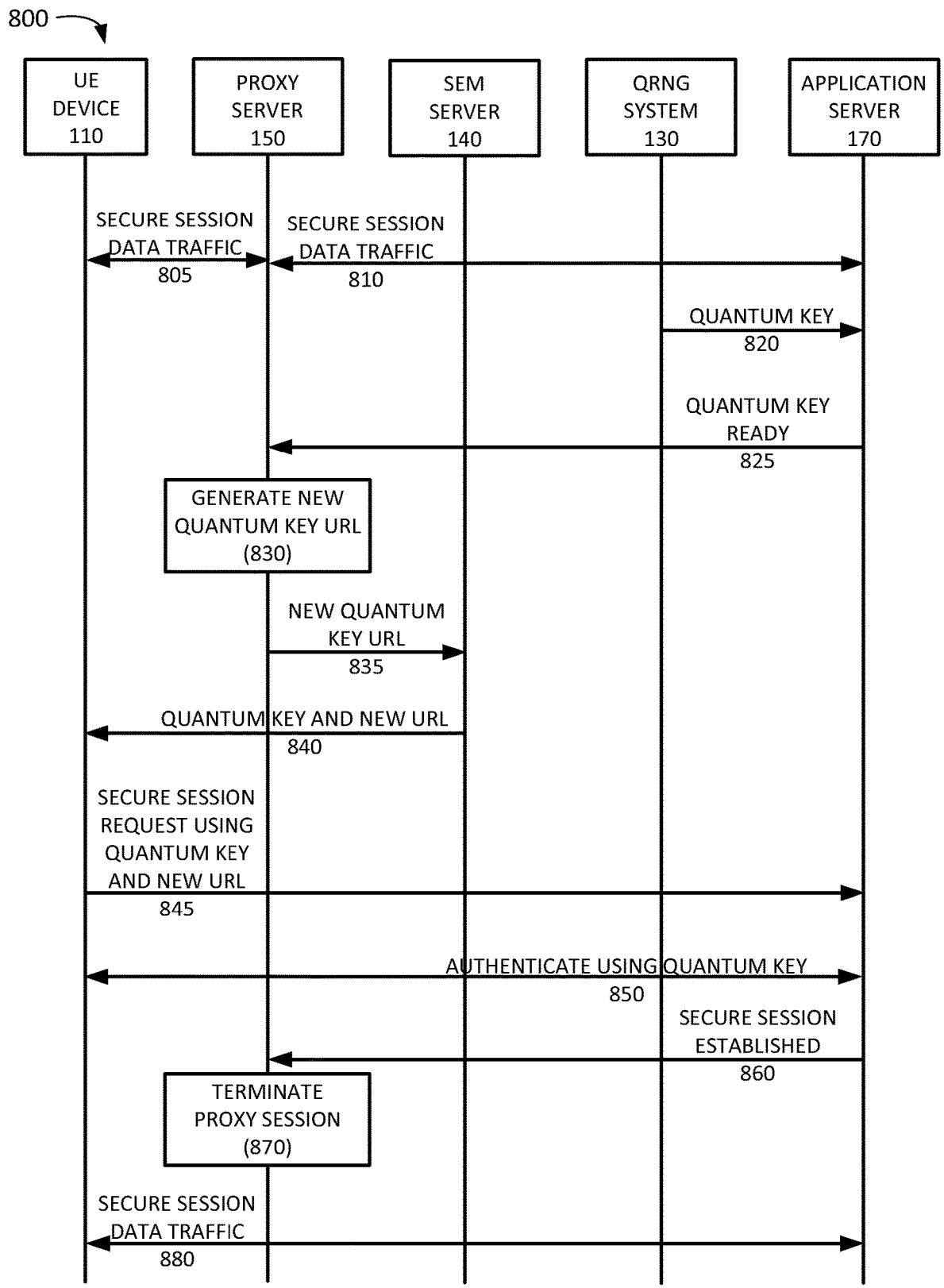
FIG. 8 is a second exemplary signal flow diagram according to an implementation described herein.

FIG. 8 is a second exemplary signal flow 800 according to an implementation described herein. Signal flow 800 may be performed when application server 170 is quantum ready. As shown in FIG. 8, signal flow 800 may an established secure session being proxied by proxy server 150 between UE device 110 and application server 170 (signals 805 and 810). At a later time, QRNG system 130 may provide the quantum key to application server 170 (signal 820). In response, application server 170 may send an indication to proxy server 150 that application server 170 is quantum ready (signal 825).

In response to receiving the indication that application server 170 is quantum ready, proxy server 150 may generate a new quantum key URL (block 830) and provide the new quantum key URL to SEM server 140 (signal 835). SEM server 140 may provide the new URL, and the quantum key associated with the new URL, to secure element 112 in UE device 110 (signal 840). In response, UE device 110 may use the quantum key, previously obtained from SEM server 140, and the new URL obtained from SEM server 140, to request a secure session with application server 170 (signal 845). Application server 170 may perform a TLS handshake with UE device 110 using the quantum key (signal 850) to authenticate and establish a secure session between UE device 110 and application server 170.

Application server 170 may then send an indication to proxy server 150 that the secure session with UE device 110 has been established (signal 860) and proxy server 150 may terminate the proxy session (signal 870). UE device 110 and application server 170 may then begin to exchange data traffic using the established secure session (signal 880).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, and a series of signals with respect to FIGS. 7 and 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
obtaining, by a device, a quantum key generated using quantum random numbers received from a quantum random number generator;
obtaining, by the device, a digital signature for a uniform resource locator (URL) associated with the obtained quantum key and a hash of the quantum key, wherein the digital signature and the hash of the quantum key are received from a security device configured to provide the quantum key to a user equipment (UE) device;
receiving, by the device and from an application server, a request for the device to function as a proxy for a secure session with the UE device;
sending, by the device, an indication to the application server that the UE device is ready for authentication based on obtaining the hash of the quantum key and obtaining the digital signature for the URL associated with the quantum key;
authenticating, by the device, the secure session with the UE device using the quantum key and the digital signature, wherein authenticating the secure session with the UE device using the quantum key and the digital signature includes:
receiving a request from the UE device to establish the secure session with the quantum key using the URL;
associate the URL with the quantum key using the received hash of the quantum key;
verifying the URL using the digital signature, in response to receiving the request from the UE device; and
establishing the secure session using the quantum key, in response to verifying the URL using the digital signature; and
proxying, by the device, the secure session between the UE device and the application server.

2. The method of claim 1, wherein proxying the secure session between the UE device and the application server includes at least one of:
forwarding messages from the UE device associated with the secure session to the application session; or
forwarding messages from the application server associated with secure session to the UE device.

3. The method of claim 1, wherein establishing the secure session using the quantum key includes:
performing a Transport Layer Security (TLS) handshake with the UE device using the quantum key.

4. The method of claim 1, further comprising:
transferring an existing session between the UE device and the application server to the secure session, after authenticating the secure session with the UE device using the quantum key and the digital signature; and
instructing the application server to terminate the existing session.

5. The method of claim 1, further comprising:
receiving an indication from the application server that the application server is ready for quantum key authentication;
generating a new URL for the application server for the secure session; and
providing the new URL to the security device to forward to the UE device.

6. The method of claim 5, further comprising:
receiving an indication from the application server that the UE device has established a new secure session with the application server using the new URL;
transferring the secure session with the UE device to the new secure session; and
terminating the secure session between the UE device and the device.

7. A device comprising:
a processor configured to:
obtain a quantum key generated using quantum random numbers received from a quantum random number generator;
obtain a digital signature for a uniform resource locator (URL) associated with the obtained quantum key and a hash of the quantum key, wherein the digital signature and the hash of the quantum key are received from a security device configured to provide the quantum key to a user equipment (UE) device;
receive a request, from an application server, for the device to function as a proxy for a secure session with the UE device;
send an indication to the application server that the UE device is ready for authentication based on obtaining the hash of the quantum key and obtaining the digital signature for the URL associated with the quantum key;
authenticate the secure session with the UE device using the quantum key and the digital signature, wherein, when authenticating the secure session with the UE device using the quantum key and the digital signature, the processor is configured to:
receive a request from the UE device to establish the secure session with the quantum key using the URL;

associate the URL with the quantum key using the received hash of the quantum key;

verify the URL using the digital signature, in response to receiving the request from the UE device; and establish the secure session using the quantum key, in response to verifying the URL using the digital signature; and proxy the secure session between the UE device and the application server.

8. The device of claim 7, wherein, when proxying the secure session between the UE device and the application server, the processor is further configured to at least one of:

forward messages from the UE device associated with the secure session to the application session; or forward messages from the application server associated with secure session to the UE device.

9. The device of claim 7, wherein, when verifying the URL using the digital signature, the processor is further configured to:

perform a Transport Layer Security (TLS) handshake with the UE device using the quantum key.

10. The device of claim 7, wherein the processor is further configured to:

transfer an existing session between the UE device and the application server to the secure session, after authenticating the secure session with the UE device using the quantum key and the digital signature; and instruct the application server to terminate the existing session.

11. The device of claim 7, wherein the processor is further configured to:

receive an indication from the application server that the application server is ready for quantum key authentication;

generate a new URL for the application server for the secure session; and provide the new URL to the security device to forward to the UE device.

12. The device of claim 11, wherein the processor is further configured to:

receive an indication from the application server that the UE device has established a new secure session with the application server using the new URL;

transfer the secure session with the UE device to the new secure session; and terminate the secure session between the UE device and the device.

13. A system comprising:

a security device configured to:

provide a quantum key and a uniform resource locator (URL) via which to establish a secure session with an application server; and a proxy device configured to:

obtain a hash of the quantum key and a digital signature for the URL associated with the quantum key from the security device;

receive a request from the application server to function as a proxy for a secure session with the UE device;

send an indication to the application server that the UE device is ready for authentication based on obtaining the hash of the quantum key and obtaining the digital signature for the URL associated with the quantum key;

authenticate the secure session with the UE device using the quantum key and the digital signature, wherein, when authenticating the secure session with the UE device using the quantum key and the digital signature, the proxy device is configured to:

receive a request from the UE device to establish the secure session with the quantum key using the URL;

associate the URL with the quantum key using the received hash of the quantum key;

verify the URL using the digital signature, in response to receiving the request from the UE device; and establish the secure session using the quantum key, in response to verifying the URL using the digital signature; and proxy the secure session between the UE device and the application server.

14. The system of claim 13, wherein, when verifying the URL using the digital signature, the proxy device is further configured to:

perform a Transport Layer Security (TLS) handshake with the UE device using the quantum key.

15. The system of claim 13, wherein the proxy device is further configured to:

transfer an existing session between the UE device and the application server to the secure session, after authenticating the secure session with the UE device using the quantum key and the digital signature; and instruct the application server to terminate the existing session.

16. The system of claim 13, wherein the security device is further configured to:

receive the quantum key from a quantum random number generator.

17. The system of claim 13, wherein the proxy device is further configured to:

receive an indication from the application server that the application server is ready for quantum key authentication;

generate a new URL for the application server for the secure session; and provide the new URL to the security device to forward to the UE device.

18. The system of claim 17, wherein the proxy device is further configured to:

receive an indication from the application server that the UE device has established a new secure session with the application server using the new URL;

transfer the secure session with the UE device to the new secure session; and terminate the secure session between the UE device and the device.

19. The method of claim 1, wherein the device is associated with a Software Defined Perimeter (SDP) network.

20. The device of claim 7, wherein the device is associated with a Software Defined Perimeter (SDP) network.

* * * * *